United States Patent
Yan et al.

(10) Patent No.: US 8,306,223 B2
(45) Date of Patent: Nov. 6, 2012

(54) METHOD AND A SYSTEM FOR TRANSMITTING ENCRYPTED CONTROL MESSAGE BASED ON MOBILE MULTIMEDIA BROADCAST

(75) Inventors: Xiangbiao Yan, Shenzhen (CN); Biao Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 409 days.

(21) Appl. No.: 12/663,707

(22) PCT Filed: Jun. 12, 2008

(86) PCT No.: PCT/CN2008/071280
§ 371 (c)(1),
(2), (4) Date: Dec. 10, 2009

(87) PCT Pub. No.: WO2008/151575
PCT Pub. Date: Dec. 18, 2008

(65) Prior Publication Data
US 2010/0195832 A1      Aug. 5, 2010

(30) Foreign Application Priority Data

Jun. 14, 2007    (CN) .......................... 2007 1 0108667

(51) Int. Cl.
*H04N 7/167*     (2011.01)
(52) U.S. Cl. ........................................ 380/212; 380/239
(58) Field of Classification Search .................... 380/43, 380/212, 239, 270, 277; 713/168
See application file for complete search history.

(56) References Cited

U.S. PATENT DOCUMENTS

| | | | |
|---|---|---|---|
| 5,161,191 A | | 11/1992 | Gupta |
| 5,937,067 A | * | 8/1999 | Thatcher et al. ............... 380/212 |
| 6,069,956 A | * | 5/2000 | Kurihara ........................ 380/212 |
| 6,424,717 B1 | * | 7/2002 | Pinder et al. ................... 380/239 |
| 6,510,519 B2 | * | 1/2003 | Wasilewski et al. ........... 713/168 |
| 6,526,508 B2 | * | 2/2003 | Akins et al. .................... 713/168 |
| 2002/0094084 A1 | | 7/2002 | Wasilewski et al. |
| 2005/0013277 A1 | | 1/2005 | Marque-Pucheu |
| 2005/0259813 A1 | * | 11/2005 | Wasilewski et al. ............ 380/28 |
| 2007/0143854 A1 | * | 6/2007 | Wasilewski ...................... 726/26 |
| 2007/0189525 A1 | * | 8/2007 | Wajs ............................... 380/42 |

FOREIGN PATENT DOCUMENTS

| | | |
|---|---|---|
| CN | 1160317 A | 9/1997 |
| CN | 1175142 A | 3/1998 |
| CN | 1517827 A | 8/2004 |
| CN | 1889575 A | 1/2007 |
| CN | 1933580 A | 3/2007 |
| CN | 1972184 A | 5/2007 |
| CN | 1972471 A | 5/2007 |

(Continued)

OTHER PUBLICATIONS

International Search Report in international application No. PCT/CH2008/071280, mailed Sep. 11, 2009.

(Continued)

*Primary Examiner* — Samson Lemma
(74) *Attorney, Agent, or Firm* — Oppedahl Patent Law Firm LLC

(57) ABSTRACT

This invention provides a method and a system for transmitting an encrypted control message based on the mobile multimedia broadcast. The said method includes: encapsulating the media data of the program and the encrypted control message in the multiplex sub-frames of the multiplex frame; and setting the encrypted control message identifier in the header of multiplex sub-frames for indicating whether the encrypted control message is included in the multiplex sub-frames. The mobile multimedia system sends the media data and the encrypted control message out through the multiplex frame.

10 Claims, 4 Drawing Sheets

FOREIGN PATENT DOCUMENTS

| | | |
|---|---|---|
| EP | 0779738 A2 | 6/1997 |
| EP | 1892988 A | 2/2008 |
| JP | 2006352490 A | 12/2006 |
| JP | 2006352490 A2 | 12/2006 |
| KR | 20060132373 A | 12/2006 |
| KR | 20070057358 A | 6/2007 |
| RU | 2214684 C2 | 10/2003 |
| RU | 2256299 C2 | 7/2005 |

OTHER PUBLICATIONS

English Translation of the Written Opinion of the International Search Authority in international application No. PCT/CN2008/071280, mailed on Sep. 11, 2008.

Written opinion for international application No. PCT/CN2008/071280, mailed Sep. 11, 2008.

* cited by examiner

METHOD AND A SYSTEM FOR TRANSMITTING ENCRYPTED CONTROL MESSAGE BASED ON MOBILE MULTIMEDIA BROADCAST

TECHNICAL FIELD

The present invention relates to the technical field of mobile multimedia broadcast or mobile television, especially to a method and a system for transmitting an encrypted control message based on a mobile multimedia broadcast.

BACKGROUND

Mobile multimedia broadcast is a broadcast technology coming into recent use. Using this technology, multimedia services like television can be provided on the handheld terminal even if it is moving fast. The terminal receives a multimedia service program list through a wireless broadcast channel, and can select any one from among authorized television channels, so as to receive multimedia data of the selected channel for watching television on the mobile terminal.

The encryption and authorization system of a mobile multimedia broadcast system encrypts the media data such as audio and video data, so that only authorized users can decrypt the media data with the encrypted control message, and can then play the programs of multimedia broadcast normally, while unauthorized users cannot decrypt the media data with the encrypted control message, which guarantees the normal operation of mobile multimedia broadcast.

During the above-mentioned process, the mobile multimedia broadcast system needs to transmit the encrypted control message to a user through an appropriate transmission channel, and the user obtains the encryption key from the encrypted control message to decrypt media data, thereby accessing multimedia broadcast services normally. There are many methods for transmitting an encrypted control message, among which the traditional out-band transmission method can transmit an encrypted control message through a transmission channel of a mobile communication network or that of a wideband wireless network, but correlation indications of services have to be added, so as to indicate that the transmitted encrypted control message will be used for a certain specified multimedia service or a certain type of established multimedia services, which will lead to the increase in use of transmission bandwidth and further to the increase of operation cost and finally will go against the development of broadcast network. The in-band transmission method uses the same mobile multimedia broadcast channel as the service media data to transmit the encrypted control message, for example, a digital television broadcast system packs an encrypted control message into transmission stream packets for transmission, because it also requires adding correlation indications of services to use transmission packets of separated service media data, and this will also consume more bandwidth.

It can be seen from the above-mentioned description that, traditionally, no matter which method is adopted to transmit an encrypted control message, correlation indications of services have to be added, which will occupy some transmission bandwidth, thus will reduce the utilization ratio of transmission bandwidth, and thus will further increase the operation cost of a mobile multimedia broadcast network. Therefore, a method for transmitting an encrypted control message that can overcome or avoid the above-mentioned disadvantages is required.

SUMMARY

The present invention is made in consideration of the above-mentioned problems; therefore, the present invention aims to provide a scheme for transmitting an encrypted control message based on mobile multimedia broadcast.

According to the embodiments of the present invention, a method for transmitting an encrypted control message based on mobile multimedia broadcast is provided.

In this method, the media data of a program and the encrypted control message are encapsulated in a multiplex sub-frame of a multiplex frame; an encrypted control message identifier is set in the multiplex sub-frame header of the multiplex sub-frame for indicating whether the multiplex sub-frame comprises the encrypted control message; and a mobile multimedia system sends the media data and the encrypted control message out through the multiplex frame.

The encrypted control message may be encapsulated in the data segment of the multiplex sub-frame.

Specifically, the value of the encrypted control message identifier may be used to indicate whether the multiplex sub-frame comprises the encrypted control message.

This method further comprises: after receiving the multiplex sub-frame, a receiver of the program judges whether the multiplex sub-frame is encapsulated with the encrypted control message according to the encrypted control message identifier, and extracts the encrypted control message if the judging result is positive. The receiver may further submit the extracted encrypted control message to a decryption system; the decryption system obtains the encrypted control words from the encrypted control message, and decrypts the media data with the encrypted control words.

According to the embodiments of the present invention, a system for transmitting an encrypted control message based on mobile multimedia broadcast is provided.

This system comprises: an encrypted control message encapsulating part, being used for encapsulating the media data of a program and the encrypted control message in a multiplex sub-frame of a multiplex frame; and an encrypted control message identifier setting part, being used for setting an encrypted control message identifier in the multiplex sub-frame header of the multiplex sub-frame to indicate whether the multiplex sub-frame comprises the encrypted control message.

Wherein, the encrypted control message encapsulating part may encapsulate the encrypted control message in the data segment of the multiplex sub-frame, and may use the value of the encrypted control message identifier to indicate whether the multiplex sub-frame comprises the encrypted control message.

The above-mentioned system further comprises: an encrypted control message identifier reading part, being used for reading the encrypted control message identifier in the multiplex sub-frame header, and judging whether the multiplex sub-frame header comprises the encrypted control message according to the encrypted control message identifier; an encrypted control message extracting part, being used for extracting the encrypted control message when the encrypted control message identifier reading part has determined that the multiplex sub-frame header comprises the encrypted control message, and submitting the encrypted control message to a decryption system.

According to the above-mentioned technical scheme of the present invention, the media data of the program and the encrypted control message are encapsulated in a multiplex sub-frame, without needing to transmit the correlation information between the service data of the program and the encrypted control message, so that bandwidth resource of the prior broadcast network is saved.

BRIEF DESCRIPTION OF THE DRAWINGS

The drawings described hereinafter are provided for further understanding of the present invention, and constitute a part of the present application, while the schematic embodiments and the illustration thereof of the present invention are used to illustrate the present invention, rather than limit the present invention. In the drawings.

DETAILED DESCRIPTION

Figure 1:
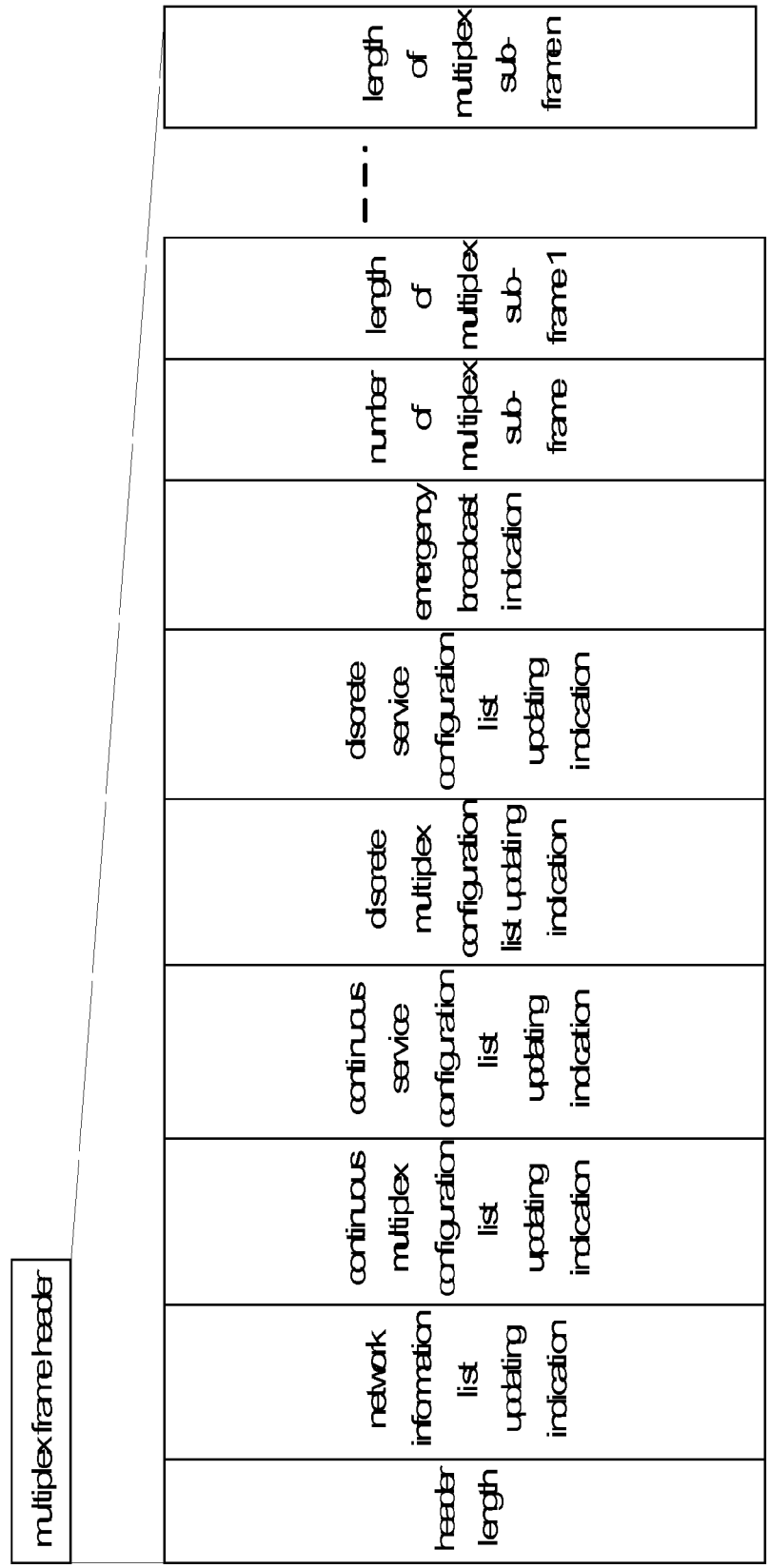
FIG. 1 is a schematic diagram illustrating the structure of the multiplex frame header according to related techniques.

In a mobile multimedia broadcast system, video data, audio data and attached data are encapsulated together to be effective load of a frame, with a frame header composed of length information, media parameters and other contents, such frame and frame header constitute a complete multiplex frame that can be transmitted in the mobile multimedia broadcast system; a multiplex frame is composed of multiple multiplex sub-frames, and the number of the multiplex sub-frames can be indicated in the multiplex frame header, wherein, the structure of the multiplex frame header is shown in FIG. 1.

The embodiments of the present invention provide a scheme for transmitting an encrypted control message based on mobile multimedia broadcast, and the main idea is to transmit the media data of the service (program) and the encrypted control message in a multiplex sub-frame. That is because, the data of one program is encapsulated in one multiplex sub-frame, one multiplex sub-frame only encapsulates the data of one program, so there is a one-to-one corresponding relation between one program and one multiplex sub-frame, and there is a natural correlation relation between the program and the multiplex sub-frame, so the media data of one program and the encrypted control message can be encapsulated in the same multiplex sub-frame for transmission, and no other correlation information is needed to guarantee the correlation relation between the media data of the service and the encrypted control message.

The embodiments of the present invention will be illustrated in detail hereinafter with reference to the drawings, wherein, the following embodiments are given to provide a comprehensive and incisive understanding of the present invention, rather than limit the present invention.

Embodiment of the Method

In this embodiment, a method for transmitting an encrypted control message based on mobile multimedia broadcast is provided.

Figure 2:
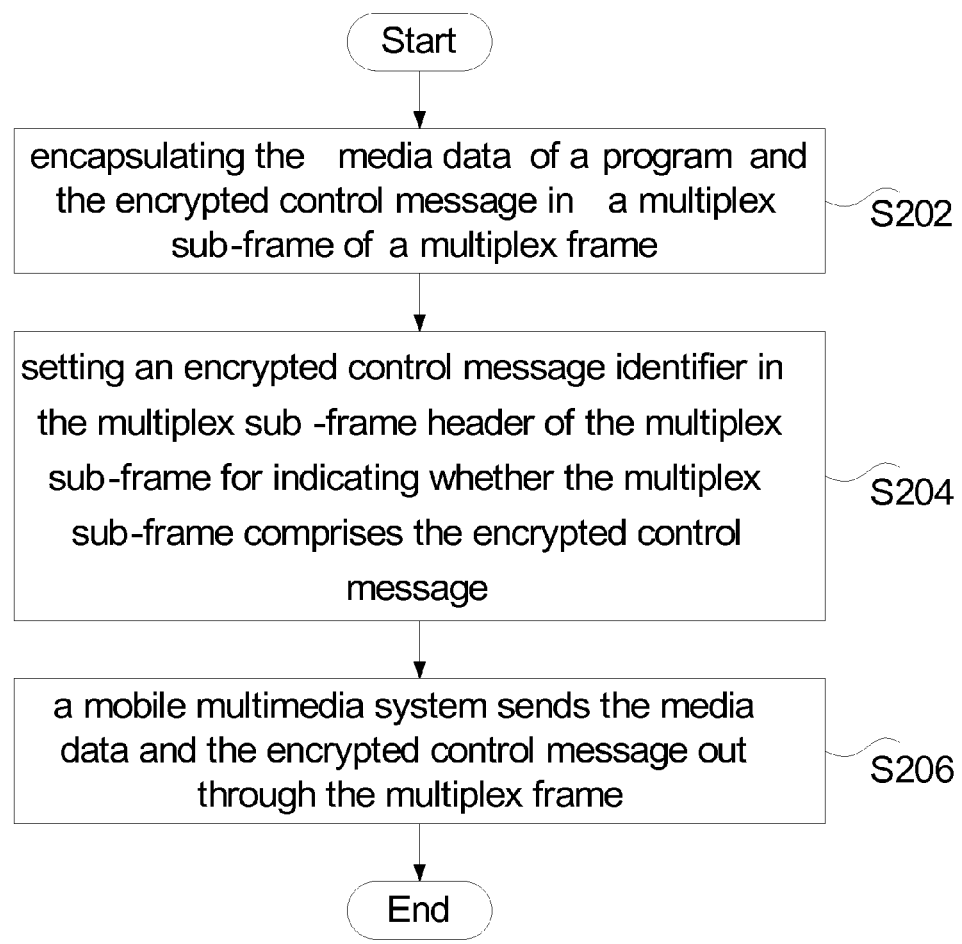
FIG. 2 is a flowchart illustrating the method for transmitting the encrypted control message according to an embodiment of the present invention.

As shown in FIG. 2, the method according to this embodiment comprises: step S202, encapsulating the media data of a program and the encrypted control message in a multiplex sub-frame of a multiplex frame; step S204, setting an encrypted control message identifier in the multiplex sub-frame header of the multiplex sub-frame for indicating whether the multiplex sub-frame comprises the encrypted control message; step S206, a mobile multimedia system sends the media data and the encrypted control message out through the multiplex frame.

Figure 3:
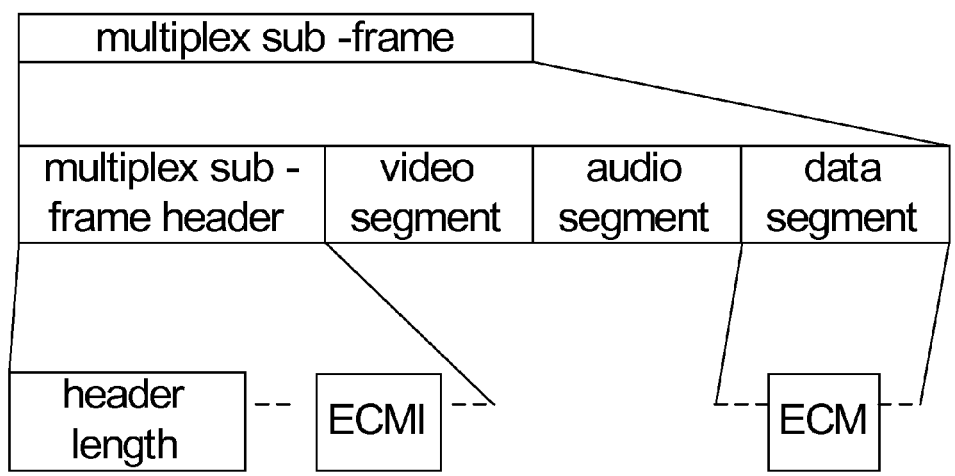
FIG. 3 is a schematic diagram illustrating the structure of the multiplex sub-frame according to an embodiment of the present invention.

In step S202, the encrypted control message is encapsulated in the data segment of the multiplex sub-frame. As shown in FIG. 3, a multiplex frame comprises multiple multiplex sub-frames, and a multiplex sub-frame is composed of multiplex sub-frame header, video segment, audio segment and data segment; the multiplex sub-frame header contains the length of the multiplex sub-frame header, the encrypted control message identifier (ECMI) and so on, while the data segment is encapsulated with the encrypted control message (ECM).

As to the ECMI, there are different ways to indicate whether the multiplex sub-frame comprises an ECM. For example, the value of ECMI can work as the indicator, when the value of the ECMI is 0, it indicates that the multiplex sub-frame does not contain any ECM, otherwise, when the value of the ECMI is not 0, it indicates that the multiplex sub-frame contains an ECM. Any appropriate way can be adopted according to practical requirement to indicate ECMI, and the different ways are all within the protection scope of the present invention.

Afterward, multiple complete multiplex sub-frames constitute a multiplex frame, which is transmitted to a mobile multimedia broadcast terminal through a mobile multimedia broadcast channel.

Preferably, after the above-mentioned step S204, the method further comprises: after receiving the multiplex sub-frame, a receiver of the program judges whether the multiplex sub-frame is encapsulated with the encrypted control message according to the ECMI, and extracts the encrypted control message if the judging result is positive.

During the above-mentioned process, when the multimedia broadcast terminal has received the multiplex frame transmitted through a mobile multimedia broadcast channel and is extracting a multiplex sub-frame from the selected program, the terminal judges whether there is any ECM in the data segment of the multiplex sub-frame according to the ECMI in the multiplex sub-frame header, if the judging result is positive, the terminal will extract the ECM from this multiplex sub-frame and send it to the decryption module of the terminal, afterward, the decryption system obtains the encrypted control words from the ECM, and decrypts the media data with the encrypted control words.

Embodiment of the Equipment

In this embodiment, a system for transmitting an encrypted control message based on mobile multimedia broadcast is provided.

Figure 4:
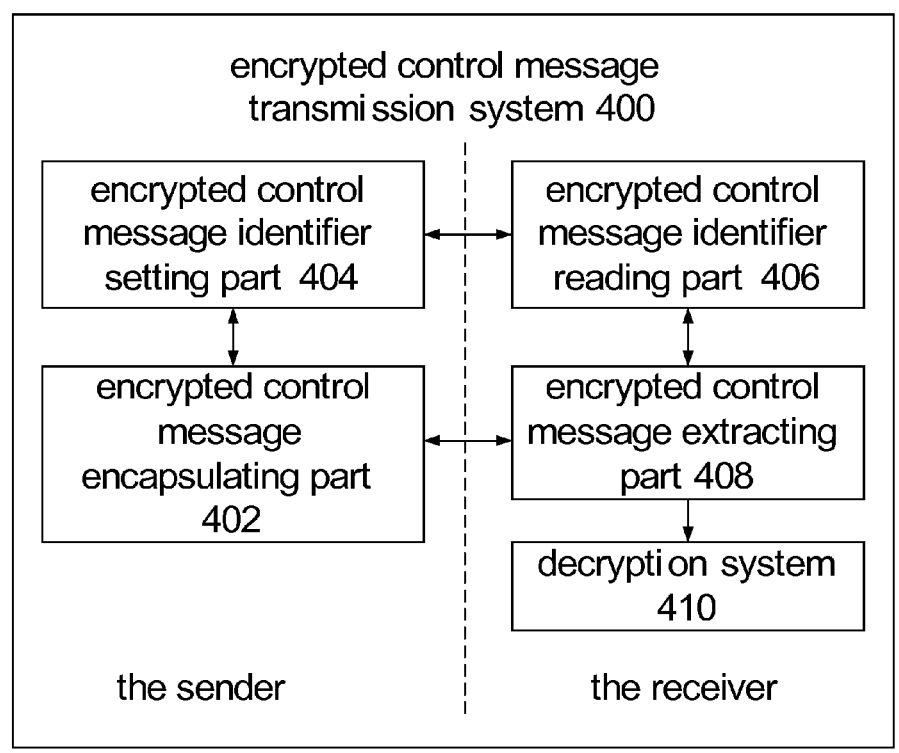
FIG. 4 is a block diagram illustrating the system for transmitting the encrypted control message according to an embodiment of the present invention.

As shown in FIG. 4, the encrypted control message transmission system 400 according to this embodiment comprises: an encrypted control message encapsulating part 402 (located at the sender), being used for encapsulating the media data of a program and the encrypted control message in a multiplex sub-frame of a multiplex frame; an encrypted control message identifier setting part 404 (located at the sender), being used for setting an ECMI in the multiplex sub-frame header of the multiplex sub-frame to indicate whether the multiplex sub-frame comprises the encrypted control message.

The encrypted control message encapsulating part 402 encapsulates the encrypted control message in the data segment of the multiplex sub-frame, and uses the value of the encrypted control message identifier to indicate whether the multiplex sub-frame comprises the encrypted control message.

Preferably, this system may further comprise the following components, while of course, the present invention can still be implemented without the following components: an encrypted control message identifier reading part 406 (located at the receiver), being used for reading the encrypted control message identifier in the multiplex sub-frame header, and judging whether the multiplex sub-frame header comprises the encrypted control message according to the encrypted control message identifier; an encrypted control message extracting part 408 (located at the receiver), being used for extracting the encrypted control message when the encrypted control message identifier reading part has determined that the multiplex sub-frame header comprises the encrypted control message, and submitting the encrypted control message to a decryption system 410.

The decryption system 410 is used for obtaining the encrypted control words from the encrypted control message, and decrypting the media data with the encrypted control words.

The same or similar parts are not described repeatedly hereby for many details described in the above-mentioned embodiment of the method are also applicable for the embodiment of the equipment.

It can be seen from the above description that, in the present invention, the media data of the service and the encrypted control message are transmitted through a multiplex sub-frame in the mobile multimedia broadcast network, so the service correlation indication of the encrypted control message is simplified, transmission bandwidth can be saved effectively, the utilization ratio of transmission bandwidth is increased, and furthermore the operation cost of the mobile multimedia broadcast network is decreased.

The above illustration is just the preferable embodiments of the present invention and not used to confine the present invention, and for those skilled in the art of field, various modifications and changes can be made to the present invention. Any modification, equivalent substitute or improvement within the spirit of the present invention is deemed to be included within the protection scope of the present invention.

What is claimed is:

1. A method for transmitting encrypted control message based on mobile multimedia broadcast, wherein,
    encapsulating the media data of a program and the encrypted control message in a multiplex sub-frame of a multiplex frame;
    setting an encrypted control message identifier in the multiplex sub-frame header of the multiplex sub-frame;
    a mobile multimedia system sending the media data and the encrypted control message out through the multiplex frame.

2. The method for transmitting encrypted control message according to claim 1, wherein, the encrypted control message is encapsulated in the data segment of the multiplex sub-frame.

3. The method for transmitting encrypted control message according to claim 1, wherein, the value of the encrypted control message identifier is used to indicate whether the multiplex sub-frame comprises the encrypted control message.

4. The method for transmitting encrypted control message according to claim 1, wherein, the method further comprises the following process:
    after receiving the multiplex sub-frame, a receiver of the program judging whether the multiplex sub-frame is encapsulated with the encrypted control message according to the encrypted control message identifier, and extracting the encrypted control message if the judging result is positive.

5. The method for transmitting encrypted control message according to claim 1, wherein, the receiver submits the extracted encrypted control message to a decryption system.

6. The method for transmitting encrypted control message according to claim 5, wherein, the decryption system obtains the encrypted control words from the encrypted control message, and decrypts the media data with the encrypted control words.

7. A system for transmitting encrypted control message based on mobile multimedia broadcast, wherein, comprising:
    a sender device for encapsulating the media data of a program and the encrypted control message in a multiplex sub-frame of a multiplex frame and setting an encrypted control message identifier in the multiplex sub-frame header of the multiplex sub-frame to indicate whether the multiplex sub-frame comprises the encrypted control message.

8. The system for transmitting encrypted control message according to claim 7, wherein, the sender device encapsulates the encrypted control message in the data segment of the multiplex sub-frame.

9. The system for transmitting encrypted control message according to claim 7, wherein, the sender device uses the value of the encrypted control message identifier to indicate whether the sub-frame comprises the encrypted control message.

10. The system for transmitting encrypted control message according to claim 7, wherein, the system further comprises:
    a receiver device for reading the encrypted control message identifier in the multiplex sub-frame header, judging whether the multiplex sub-frame header comprises the encrypted control message according to the encrypted control message identifier, extracting the encrypted control message when the encrypted control message identifier reading part has determined that the multiplex sub-frame header comprises the encrypted control message, and submitting the encrypted control message to a decryption system.

* * * * *